United States Patent [19]

Brown et al.

[11] 3,949,255
[45] Apr. 6, 1976

[54] DYNAMO-ELECTRIC MACHINES

[75] Inventors: Robert Smith Brown, Winlaton; Robert Hawley, Killingworth Village, both of England

[73] Assignee: Reyrolle Parsons Limited, England

[22] Filed: May 7, 1973

[21] Appl. No.: 357,708

[30] Foreign Application Priority Data

July 11, 1972 United Kingdom............... 32340/72

[52] U.S. Cl. ................................................ 310/214
[51] Int. Cl.² ........................................... H02K 3/43
[58] Field of Search ........... 310/214, 215, 216, 217, 310/194, 254, 258, 259; 336/197

[56] References Cited
UNITED STATES PATENTS

| 888,456 | 5/1908 | Barr | 310/214 |
|---|---|---|---|
| 1,555,065 | 9/1925 | Lindquist | 310/214 |
| 2,922,058 | 1/1960 | Bacon | 310/214 |
| 2,945,140 | 7/1960 | Drabik | 310/214 |
| 3,009,073 | 11/1961 | Drabik | 310/214 |
| 3,243,622 | 3/1966 | Whittlesey | 310/214 |
| 3,594,597 | 7/1971 | Kildishev | 310/214 |

*Primary Examiner*—R. Skudy
*Attorney, Agent, or Firm*—Holman & Stern

[57] ABSTRACT

A dynamo-electric machine provided with a retention mechanism for conductors disposed in a core slot is disclosed, wherein the mechanism comprises at least one composite wedge arrangement consisting of a first wedge having its wedge-shaped surface extending longitudinally of the slot, a second wedge similar to the first and also having its wedge-shaped surface extending longitudinally of the slot but disposed with its direction of taper opposed to that of the first wedge, there being further provided a spring member cooperating with the composite wedge arrangement, the spring member extending longitudinally of the slot and its deformation being dependent upon the relative longitudinal displacement in the slot of the first and second wedges.

1 Claim, 6 Drawing Figures

DYNAMO-ELECTRIC MACHINES

BACKGROUND OF THE INVENTION

This invention relates to retaining means for slot-contained windings in dynamo-electric machines.

In certain types of dynamo-electric machines such as, for example, turbogenerators, the duties to be met by conductors wound in slots in a magnetic core of the machine may be extremely arduous. Problems of vibration of the conductors and retaining means of stator windings in large turbogenerators have received considerable attention and a number of solutions have been suggested and put into practice. Previous solutions have generally resulted in arrangements which present difficulties during construction or which include undesirable materials.

SUMMARY OF THE INVENTION

The object of the present invention is to provide improved means for the retention of slot-contained conductors in the cores of dynamo-electric machines.

According to the present invention, a dynamo-electric machine is provided with retention means for conductors disposed in a core slot, which means comprise at least one composite wedge arrangement consisting of a first wedge having its wedge-shaped surface extending longitudinally of the slot, a second wedge similar to the first and also having its wedge-shaped surface extending longitudinally of the slot but disposed with its direction of taper opposed to that of the first wedge, there being further provided a spring member cooperating with the composite wedge arrangement, the spring member extending longitudinally of the slot and its deformation being dependent upon the relative longitudinal displacement in the slot of the first and second wedges.

The spring member preferably takes the form of an undulating strip, the trough and crest lines of which are disposed transversely of the slot. There may be a separate length of spring associated with each composite wedge arrangement where, as will generally be the case, more than one composite wedge in a slot is used. Alternatively, two or more composite wedge arrangements may be distributed, end-to-end adjacent a single length of spring member.

The spring member is preferably disposed between the two wedges of a composite wedge but may be disposed between the composite wedge and a slot closure member or some other part of the slot-winding structure.

Each wedge, or a single wedge, of a composite wedge arrangement may be provided with a slot in its surface to locate the spring member.

In the preferred embodiment of the invention, the composite wedge or wedges and spring member or members are disposed in a U-section closure member running along the mouth of the slot.

BRIEF DESCRIPTION OF THE DRAWINGS

The invention will now be further described with reference to the drawings of which.

DETAILED DESCRIPTION OF THE PREFERRED EMBODIMENTS

Figure 1:
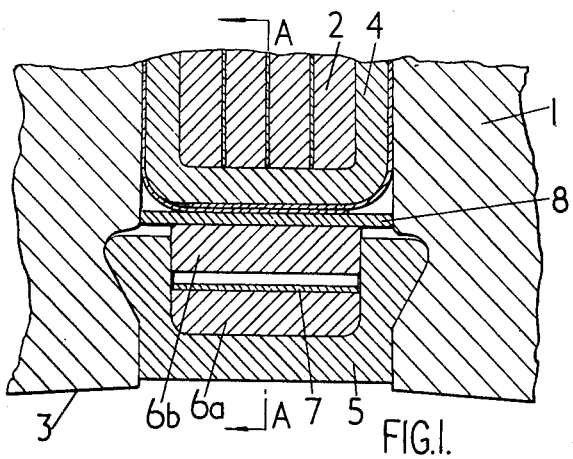
FIG. 1 shows a part-section view, taken transversely of a slot, of a slot winding retaining arrangement for a turbogenerator stator in accordance with the preferred form of the invention.
Figure 2:
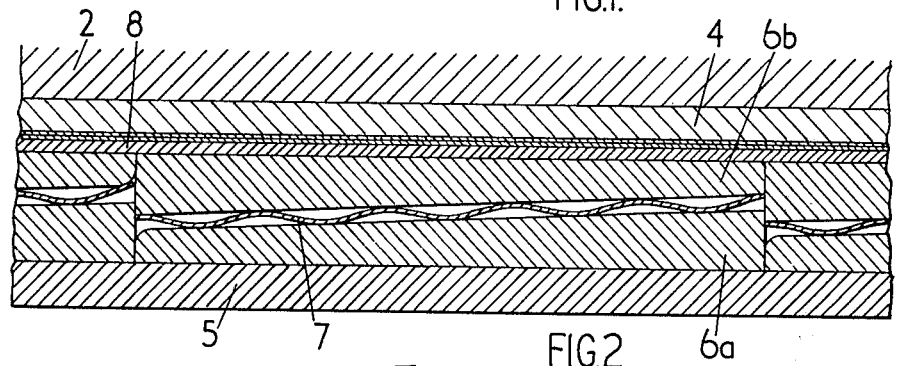
FIG. 2 shows a part section view, taken longitudinally in the direction of arrows A—A, of the arrangement shown in FIG. 1.

Referring first to FIGS. 1 and 2, the stator core 1 of the turbogenerator shown is provided with a stator winding comprising conductors forming a conductor bar 2 disposed in a slot opening into the radially inner surface 3 of the core 1. The base of the slot and the portions of conductor bar 2 lying therein are not shown in the Figures. Conductor bar 2 is surrounded by insulation 4, as shown.

The mouth of the slot shown is closed by closure member 5 of U-shaped cross-section. Conductor retaining means comprising a composite wedge arrangement consisting of a first wedge 6a and a second similar wedge 6b, together with an undulating spring member 7, are disposed in the channel or member 5. A packing piece 8, also serving as a load distributor, is disposed between wedge 6b and the insulated conductor bar 2.

As may be seen in FIG. 2, wedge 6a is positioned in the slot so that it tapers in the opposite sense longitudinally of the slot to wedge 6b, the radially inner surface of wedge 6a and the radially outer surface of 6b thus being parallel. It is thus possible by relative longitudinal adjustment of the wedge 6a with respect to the wedge 6b to vary the width of the space between them in which spring member 7 is situated. The compression of spring member 7 may consequently be varied, which in turn enables the radial force exerted between closure member 5 and the conductor bar 2 to be adjusted and set. Radial movement of conductor bar 2 in the slot is thus prevented.

With the arrangement shown in FIGS. 1 and 2, adjacent composite wedge and spring arrangements along a slot may be so arranged that, for each arrangement, the space between the wedges of each composite wedge within which the spring member is located is terminated at both ends by end faces of the wedges of adjacent composite wedges. Longitudinal migration of the spring members in the slots is thus prevented.

A further advantage of the arrangement is that wedge 6b and packing piece 8 serve to prevent any damage being caused to the insulation 4 on the conductor bar 2.

Figure 3:
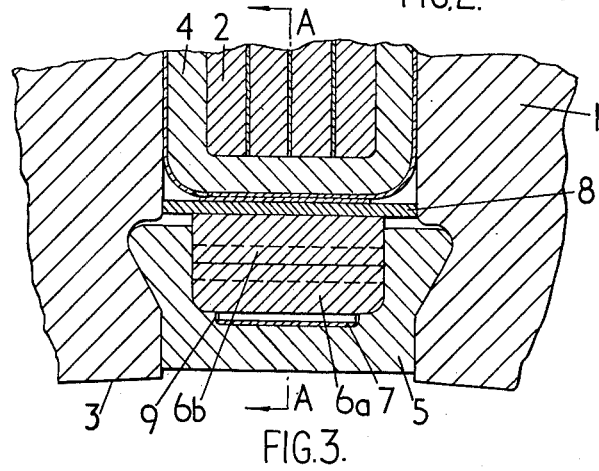
FIGS. 3 and 4 are similar to FIGS. 1 and 2, but show an alternative form of retaining arrangement in accordance with the invention.
Figure 4:
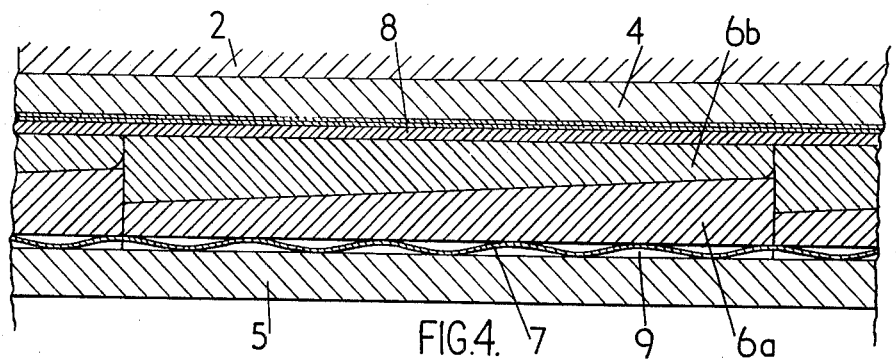

In the alternative embodiment of the invention shown in FIGS. 3 and 4, spring member 7 is not disposed between the wedges of a composite wedge but lies between the composite wedge and the central section of U-shaped closure member 5 in a slot 9 formed in the channel of member 5. The spring member 7 in this arrangement may extend over an axial length of slot in which several composite wedge arrangements are contained.

Figure 5:
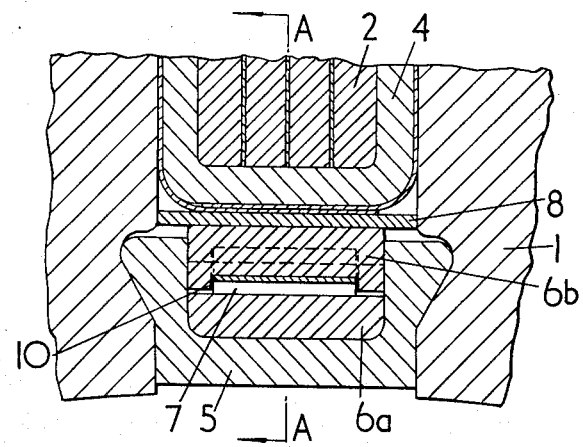
FIGS. 5 and 6 are also similar to FIGS. 1 and 2 and show a further alternative form of retaining arrangement in accordance with the invention.
Figure 6:
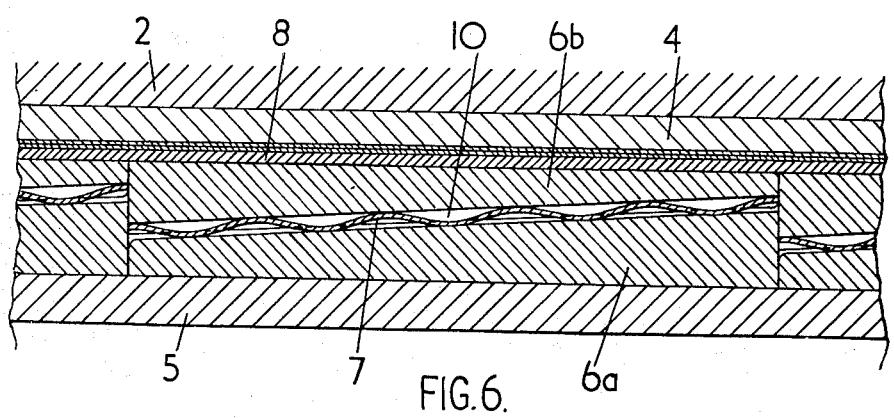

The embodiment of the invention shown in FIGS. 5 and 6 is similar to that shown in FIGS. 1 and 2 in that a separate spring member is disposed between the wedges of a composite wedge arrangement, the only difference being that the spring member is located in this case in a slot 10 formed in the wedge 6b. The provision of such a slot in one of the wedges or of similar opposing slots in both wedges affords the advantage of preventing axial migration of the spring member.

In both the embodiments described with reference to FIGS. 3 and 4 and that described with reference to FIGS. 5 and 6, housing the springs in slots provides mechanical stops for the wedges. Springs can thus be used which will not be compressed below a predetermined size at which size the mechanical stress in the spring can be safely withstood.

The wedges in the embodiments described are preferably constructed of epoxy resin glass material and the springs may be of epoxy resin impregnated glass fiber material.

The invention is not confined to arrangements using undulating springs as described in the embodiments. Suitable alternative springs may be flat strips having protrusions of the "belville" washer type, for example. Where undulating springs are used, the lines of the troughs and crests need not necessarily be transverse to the slot length.

What is claimed is:

1. A dynamo-electric machine provided with retention means for conductors disposed in a core slot, comprising in combination at least one composite wedge arrangement consisting of a first tapered wedge having a wedge-shaped surface thereof extending longitudinally of the slot, and a second tapered wedge similar to said first wedge and having a wedge-shaped surface thereof extending longitudinally of the slot but disposed with its direction of taper opposed to that of said first wedge, a spring member cooperating with said composite wedge arrangement, said spring member extending longitudinally of the slot and having its deformation dependent upon the relative longitudinal displacement in the slot of said first and second wedges, and wherein said composite wedge and said spring member are disposed in a U-section closure member running along the mouth of the slot.

* * * * *